United States Patent [19]

Otani et al.

[11] Patent Number: 5,300,873
[45] Date of Patent: Apr. 5, 1994

[54] MOTOR CONTROL APPARATUS

[75] Inventors: Kenji Otani; Fumihiko Ito, both of Kyoto, Japan

[73] Assignee: Rohm Co., Ltd., Kyoto, Japan

[21] Appl. No.: 970,569

[22] Filed: Nov. 3, 1992

[30] Foreign Application Priority Data

Nov. 7, 1991 [JP] Japan ................ 3-319980

[51] Int. Cl.$^5$ ............................................. H02P 5/28
[52] U.S. Cl. .................... 318/807; 318/608; 318/661
[58] Field of Search ................ 318/807, 608, 661, 607

[56] References Cited

U.S. PATENT DOCUMENTS

| 4,758,771 | 7/1988 | Saito et al. | 318/807 |
| 4,901,001 | 2/1990 | Saito et al. | 318/807 |
| 4,972,186 | 11/1990 | Morris | 318/661 |

Primary Examiner—William M. Shoop, Jr.
Assistant Examiner—Karen Masih
Attorney, Agent, or Firm—Koda and Androlia

[57] ABSTRACT

A motor control apparatus for rotating a motor smoothly. A sine wave form which is an ideal wave form of a signal is stored, and the motor is driven by a signal having the ideal wave form obtained by correcting the period and the phase of the stored sine wave form. A comparator receives a detection signal which indicates the rotating state of the motor through an A/D converter, and obtains the correction values of the current period and phase. A wave form setting means corrects the set period and phase, generates a sine wave having the corrected period and phase on the basis of the sine wave data stored in a sine wave data region, and outputs a driving signal having the sine wave form through a D/A converter.

11 Claims, 3 Drawing Sheets

MOTOR CONTROL APPARATUS

BACKGROUND OF THE INVENTION

1. Field of the Invention

The present invention relates to a motor control apparatus and, more particularly, to an apparatus for controlling a motor so as to smoothly rotate at a stable rotational frequency. More specifically, the present invention relates to an improvement of a control apparatus for a cylinder motor which is used in a video tape recorder and for a spindle motor which is used in an OA (office automation) machine such as a flexible disk drive, hard disk drive or an optical disk drive.

2. Description of the Related Art

FIG. 3 shows a three-phase motor control apparatus as an example of a conventional motor control apparatus.

The motor control apparatus is composed of a motor 5, a sensing circuit mainly constituted by Hall elements 1, ..., an input amplifier 2, a driving signal generator 3, and an output amplifier 4 which are connected with each other in that order so as to make a loop.

The motor 5 is a three-phase star connection type and has three coils 5a, 5b and 5c. A driving supply voltage Vcc' is applied to the common connection point of these three coils.

The input amplifier 2 amplifies minute signals. It is mainly composed of three differential amplifiers 2a, ....

The output amplifier 4 is mainly composed of power amplifiers 4a, 4b and 4c and controls the driving current which flows from the connection to which the supply voltage Vcc' is applied to the motor 5 through the coils 5a, 5b and 5c.

The operation of the motor control apparatus having the above-described structure will now be explained. The outputs of the Hall elements 1, ... for detecting the rotating state of the motor 5 are first supplied to the input amplifier 2. In the input amplifier 2, the differential amplifiers 2a, ... amplify and shape the wave forms of the outputs of the Hall elements 1, ... and supply detection signals S to the driving signal generator 3.

The driving signal generator 3 synthesizes the three detection signals S at a predetermined ratio and, if necessary, delays them, thereby generating three driving signals D having a predetermined wave form and different phases and outputting them to the output amplifier 4.

In the output amplifier 4, the power amplifiers 4a, 4b and 4c amplify the respective powers of the driving signals D, and generate the driving currents in accordance with the wave form. The thus-generated driving currents flow in the coils 5a, 5b and 5c, thereby driving the motor 5.

With the rotation of the motor 5, the detection signals S are continuously generated, so that the operation repeats from the first step. In other words, the signals containing control information and the driving power information are sent along the feedback loop in the form of different signals, whereby the rotation of the motor 5 is maintained.

The rotational structure of the motor 5 will now be explained in more detail. The motor 5 has a magnetized rotor. The rotor is rotated by the rotary magnetic field on the stator side which is generated by the driving currents applied to the coils 5a, 5b and 5c. The rotation of the rotor rotates the motor 5. The rotating state of the motor 5 is determined by the number of stators and rotors, the positional relationship between the stators and the rotors, the wave form of the driving currents, etc. Therefore, it is desirable to make the wave form of each driving current as close to that of a sine wave as possible in order to obtain a smooth and stable rotation.

In a conventional motor control apparatus, however, the driving signal D is generated by amplifying the detection signal S and shaping the wave form thereof. As a result, the wave form of the original detection signal S influences the wave form of the driving signal D. In addition, since the wave form of the detection signal S depends on the positional relationship between the detecting element such as the Hall element and the element which is attached to the motor so as to be detected by the detecting element, and the sensitivity of the detecting element, the detection signal S actually has a wave form close to a trapezoidal or pulse shape instead of that of a sine wave. Such a non-ideal wave form of the driving signal D causes a fluctuation in the torque, thereby making it impossible to control the motor so as to have a smooth and stable rotation.

SUMMARY OF THE INVENTION

Accordingly, it is an object of the present invention to eliminate the above-described problems in the related art and to provide a motor control apparatus which is capable of generating a driving signal having a desired wave form irrespective of the wave form of a detection signal and which is capable of controlling a motor so as to have a smooth and stable rotation.

To achieve this aim, a motor control apparatus according to the present invention comprises: an input amplifier for detecting the rotating state of a motor by detecting the rotational position of the motor directly or indirectly from the deformation of the wave form of a driving current or the like, and outputting a detection signal which indicates the rotating state of the motor after a processing operation such as amplification; an output amplifier for amplifying the power of the driving signal supplied from the driving signal generator and applying the driving signal to the coils of the motor so as to rotate the motor; and a driving signal generator including an A/D converter, a D/A converter, a wave form setting means, a comparator and a sine wave data memory; the A/D converter receiving the detection signal and generating a digital detection signal by analog/digital conversion; the comparator detecting the period and the phase of the digital detection signal and comparing the detected period and phase with the period and the phase which are set by the wave form setting means so as to generate a correction value; the wave form setting means correcting the set period and phase in accordance with the correction value and generating a digital driving signal of the wave form having the corrected period and phase on the basis of the wave form data stored in advance; and the D/A converter converting the corrected digital driving signal into an analog driving signal.

According to this structure, the motor control apparatus of the present invention generates a driving signal not by directly utilizing the wave form of a detection signal but by utilizing only the information relating to the period and the phase of the detection signal and calculating a driving signal having an ideal wave form on the basis of the period and the phase of the detection signal.

Since the detection signal which indicates the rotating state of the motor is fundamentally obtained by a measuring means or the like, it is difficult to discern the entire wave form of the detection signal, but it is very easy and a general practice to extract a part of the information such as the period or the phase therefrom.

It is therefore generally possible to obtain the detected period and the detected phase from the detection signal of not only a sine wave but also a trapezoidal or even a pulse wave. Accordingly, the driving signal generator in the present invention is capable of constantly generating a driving signal having an approximately predetermined wave form by means of the wave form setting means irrespective of the wave form of the detection signal. In addition, since it is possible to limit the disparity between the driving signal for controlling the rotation of the motor so as to assume the target rotating state and the current motor rotating state to a predetermined range by correcting the set period and phase in accordance with the detected period and phase, it is possible to generate a driving signal of a predetermined wave form having a period and a phase which enables smooth acceleration or deceleration during the acceleration or deceleration of the motor.

In this way, since the motor is driven on the basis of the driving signal having an ideal wave form which is generated by the driving signal generator, constant smooth and stable rotation of the motor is possible.

Especially, if the ideal wave form of the driving signal is set to be a sine wave, the generation of the driving signal is further simplified. This is for the following reason. A sine wave is generally determined by an amplitude, a period and a phase. In the motor control apparatus, the amplitude is determined by the output amplifier in accordance with the control of, for example, a velocity servo, so that all that is to be determined in order to generate the driving signal is the period and the phase.

The above and other objects, features and advantages of the present invention will become clear from the following description of preferred embodiments thereof, taken in conjunction with the accompanying drawings.

DESCRIPTION OF THE PREFERRED EMBODIMENTS

An embodiment of the present invention will be explained hereinunder with reference to FIG. 1.

Figure 1:
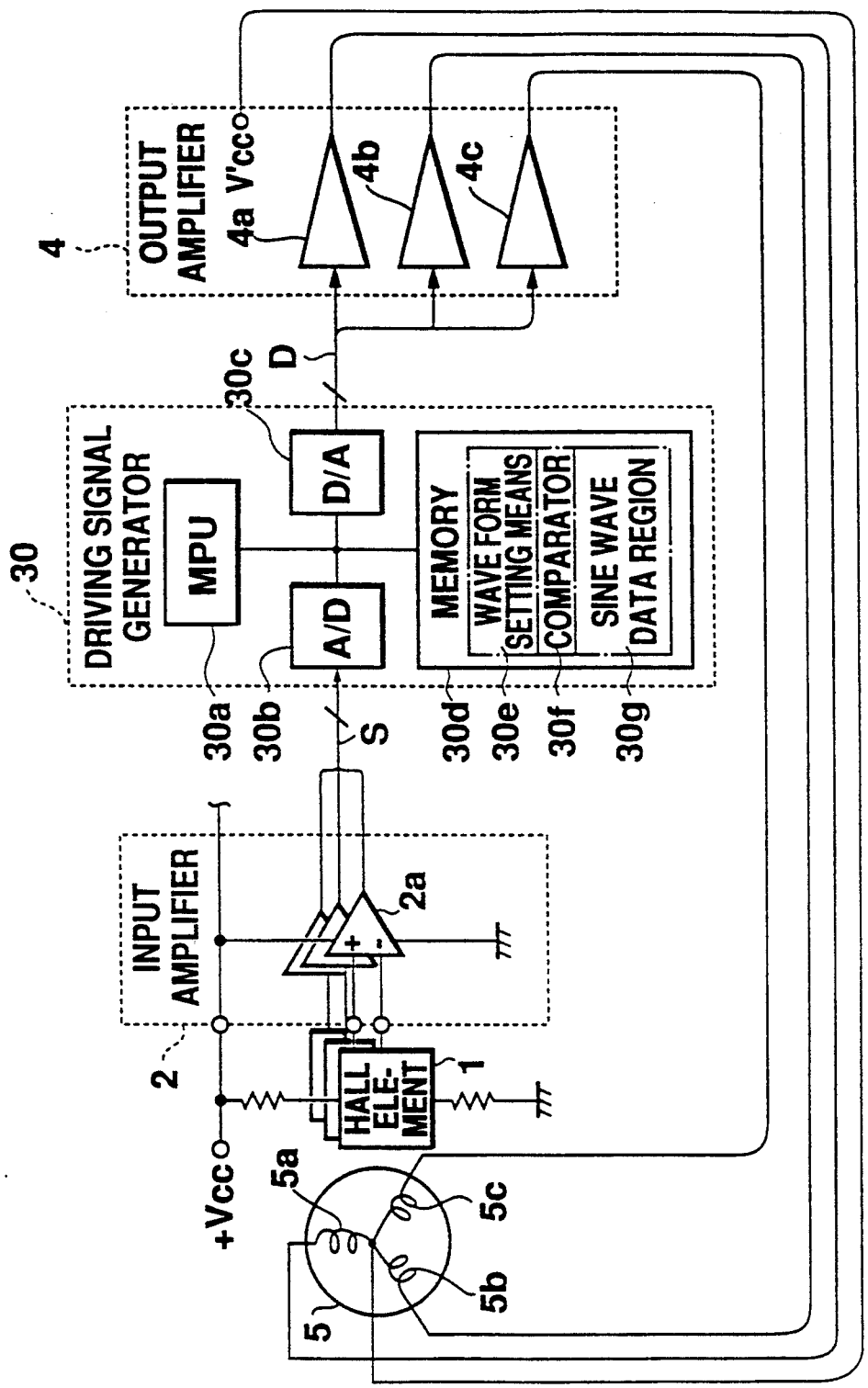
FIG. 1 shows a three-phase motor controlling and driving circuit as an embodiment of a motor control apparatus according to the present invention.
Figure 3:
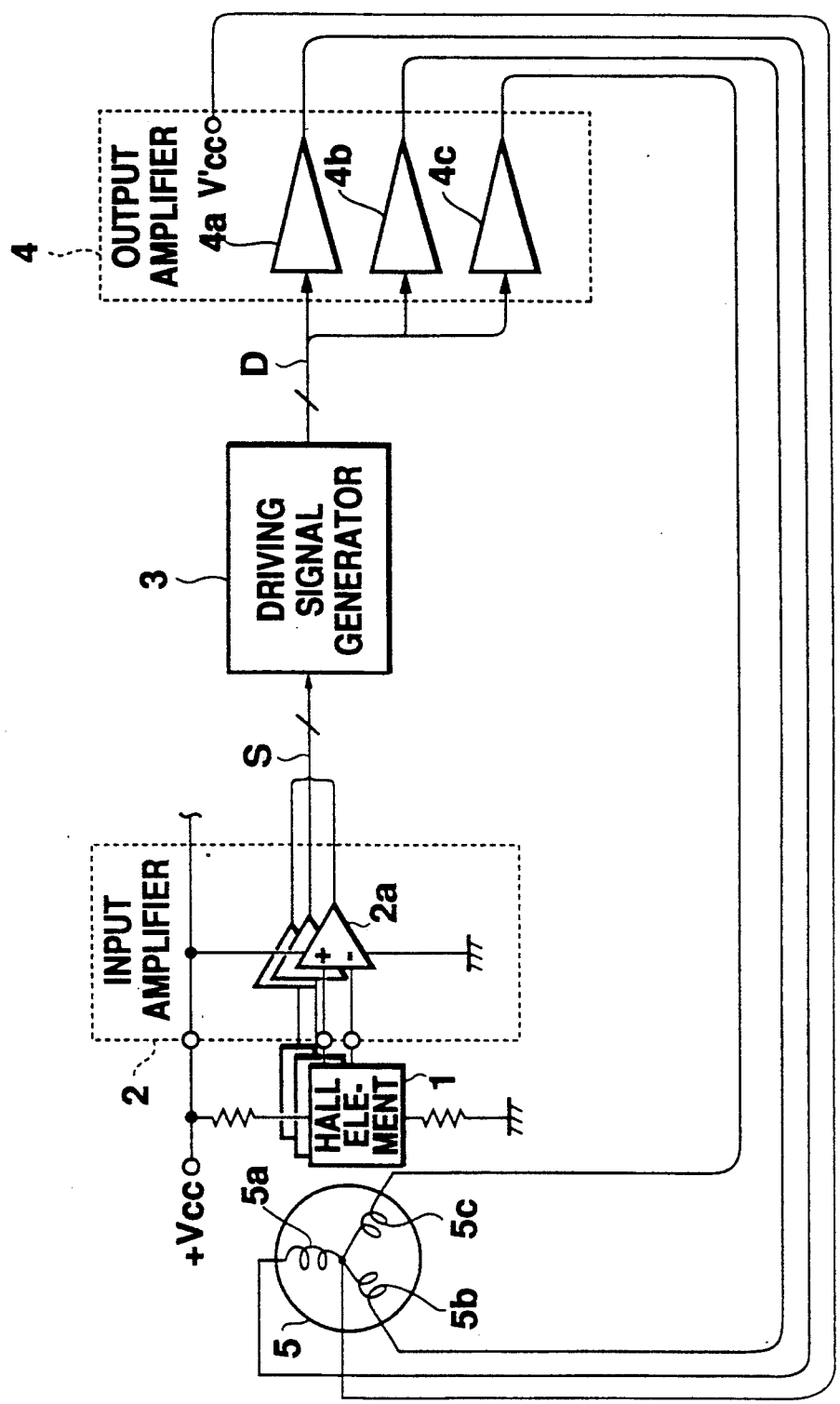
FIG. 3 shows a three-phase motor controlling and driving circuit as an example of a conventional motor control apparatus.

FIG. 1 shows a three-phase motor controlling apparatus as an embodiment of a motor control apparatus according to the present invention in correspondence with the example of a conventional motor control apparatus shown in FIG. 3.

The motor control apparatus is composed of a motor 5, a sensing circuit mainly constituted by Hall elements 1, ..., an input amplifier 2, a driving signal generator 30, and an output amplifier 4 which are connected to each other in that order so as to make a loop.

The same reference numerals are provided for the elements which are the same as those in the conventional apparatus, and explanation thereof will be omitted.

The driving signal generator 30 is composed of a microprocessor (MPU) 30a, an A/D converter 30b, a D/A converter 30c and a memory 30d which are connected together through bus lines. The memory 30d stores the code of a wave form setting means 30e, the code of a comparator 30f and the sine wave data in a sine wave data region 30g.

The A/D converter 30b receives a detection signal S and generates a digital detection signal by analog/digital conversion.

The comparator 30f extracts the detected period and the detected phase from the digital detection signal supplied through the bus line. The comparator 30f then compares the period and the phase which have been set in advance by the wave form setting means 30e with the detected period and the detected phase which are extracted from the detection signal, modifies the respective differences so that they are not beyond predetermined ranges by, for example, multiplying the differences by predetermined coefficients, and outputs the results as the corrected values. These calculations are executed by the MPU 30a.

In this way, since the comparator 30f does not output the differences obtained by the comparison as the corrected values as they are but generates the corrected values by modifying them so that they are within predetermined ranges, it is possible to limit the disparity between the driving signal for controlling the rotation of the motor so as to assume the target rotating state and the current motor rotating state to a predetermined range.

The wave form setting means 30e corrects the digital values of the set period and the set phase in accordance with the corrected values output from the comparator 30f. The wave form setting means 30e then generates a digital driving signal of a sine wave having the corrected period and the corrected phase by interpolation based on the sine wave data which are stored in the sine wave data region 30g, and supplies the digital driving signal to the D/A converter 30c through the bus line. These calculations are executed by the MPU 30a.

In this way, since the driving signal is generated simply by interpolation based on the sine wave data which have been calculated in advance and stored in the sine wave data region 30g as a model, it is possible to generate the driving signal having a sine wave form at high speed.

The D/A converter 30c converts the digital driving signal into an analog driving signal and outputs it to the output amplifier 4.

Since analog/digital and digital/analog conversion are executed by the A/D converter 30b and the D/A converter 30c, respectively, it is possible to realize the driving signal generator 30 as a digital circuit, thereby simplifying the structure of the circuit to which the generation of a sine wave form and the like is assigned.

Three signals are detected as the detection signals S in FIG. 1 in the same way as in the conventional apparatus. According to the structure of the present invention, however, it is the period and the phase of the detection signal which are necessary for the calculation of the driving signal. Accordingly, even when only one signal is detected as the detection signal S, it is easy to generate three driving signals having different phases simply by shifting the phase.

The operation of the motor control apparatus having the above-described operation will now be explained. In the same way as in the conventional apparatus, in the input amplifier 2, the differential amplifiers 2a, ... amplify and shape the wave forms of the outputs of the Hall elements 1, and supply the detection signals S to the driving signal generator 30.

Unlike in the conventional apparatus, the driving signal generator 30 then converts each of the received detection signals S into a digital signal and extracts the detected period and the detected phase therefrom. The period and the phase which have been set in advance are compared with the detected period and phase so as to correct the set period and phase. A digital driving signal of a sine wave having the corrected period and phase is generated by interpolation based on the sine wave data which are stored in the sine wave data region 30g. The thus-produced three driving signals are output to the output amplifier 4 as the analog driving signals D.

Thereafter, in the output amplifier 4, the power amplifiers 4a, 4b and 4c amplify the powers of the driving signals D and apply the generated driving currents to the coils 5a, 5b and 5c, thereby rotating the motor 5. These operations and the procedure for the maintenance of the rotation of the motor 5 are the same as those in the conventional apparatus, but since the wave form of the driving signal D generated by the driving signal generator 30 is a sine wave form, the rotation of the motor 5 becomes much smoother and stabler than in the conventional apparatus.

Figure 2:
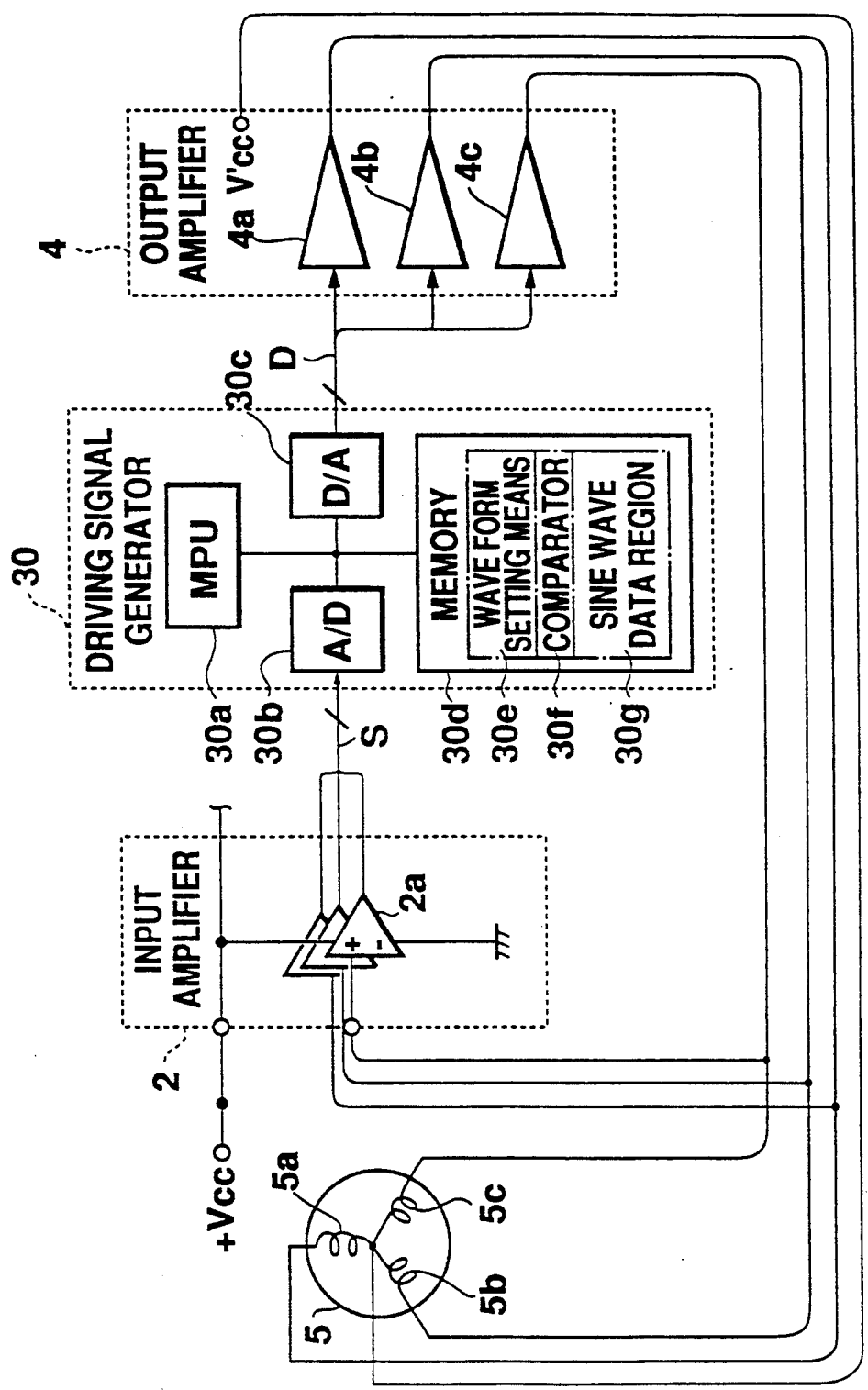
FIG. 2 shows a three-phase motor controlling and driving circuit as another embodiment of a motor control apparatus according to the present invention.

Another embodiment of the present invention will be explained in detail with reference to FIG. 2, which shows a three-phase motor control apparatus according to the present invention.

The motor control apparatus is composed of the motor 5, the input amplifier 2, the driving signal generator 30 and the output amplifier 4.

This embodiment is different from the first embodiment in that the sensing circuit is omitted, in that the input amplifier 2 inputs the output of the output amplifier 4, thereby constituting a local loop, and in that the motor 5 is disposed outside of the feedback loop.

These differences will be explained in detail hereinunder.

The input amplifier 2 is mainly composed of the three differential amplifiers 2a, ..., and detects the actual wave forms of the driving currents which flow on the coils 5a, 5b and 5c, and outputs detection signals S. However, the main function of the differential amplifiers 2a, ... is not so much amplification of the inputs as generation of the detection signals S without any influence on the driving currents by taking advantage of the high input impedance.

The comparator 30f compares the digital detection signal obtained by the A/D conversion of the detection signal S by the A/D converter 30b with the sine wave data and calculates the current period and phase of the motor 5 as the values which correspond to the differences between the digital detection signal and the sine wave data. In other words, the comparator 30f extracts the detected period and the detected phase.

Thereafter, in the same way as in the first embodiment, the correction values are calculated, the period and the phase set by the wave form setting means 30e are corrected, a digital driving signal of a sine wave having the corrected period and the corrected phase is generated by interpolation based on the sine wave data, and the thus-produced three driving signals are output to the output amplifier 4 as the analog driving signals D.

In the same way as in the first embodiment, the output amplifier 4 rotates the motor 5 on the basis of the driving signals D having a sine wave form which are produced by the driving signal generator 30, and the rotation of the motor 5 is maintained. Therefore, the rotation of the motor 5 becomes much smoother and stabler than in the conventional apparatus.

Although a three-phase motor is the object of control both in the example of a conventional apparatus and in the embodiments of the present invention, the application of the present invention is not restricted to a three-phase motor but it is also applicable to a single-phase motor or any other plural-phase motor. In addition, the number of detection signals may be smaller than the number of driving signals, as described above.

Since the amplitude of a driving signal is set by the output amplifier, the motor control apparatus may cooperate with a servo control circuit for controlling the amplification factor in the output amplifier. It is also easy to enlarge the structure of the present invention so that the motor control apparatus also serves as a velocity servo by supplying the target period from an external machine to the driving signal generator and controlling the period set by the wave form setting means so as to have the target period. More specifically, by simply providing an interface at a preceding stage of the microprocessor, it is possible to supply the target period from an external machine. The set period is so controlled as to have the target period by constantly setting the period at the target period once the set period which is increased or decreased enters a predetermined range of the target period.

As described above, in the motor control apparatus of the present invention, the wave form of the detection signal is not used as it is in the generation of a driving signal, but the period and the phase which are comparatively stable are extracted from the detection signal and a driving signal of a sine wave which corresponds to the extracted period and phase is generated. Since a current is applied to the coil of the motor in accordance with the ideal wave form, there is almost no fluctuation in the torque due to the influence of the disturbance of the wave form of the detection signal. It is therefore possible to control the motor so as to have a smooth and stable rotation without much regard to the positional relationship between the detecting element, such as the Hall element, and the element which is attached to the motor so as to be detected by the detecting element, or the sensitivity of the detecting element or the like.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A motor control apparatus for controlling the rotation of a motor by controlling a driving current which is applied to said motor, said apparatus comprising:
   an inputting circuit for detecting the rotating state of said motor and outputting a detection signal;
   a driving signal generator for generating a driving signal having a predetermined wave form on the basis of said detection signal; and an output amplifier for outputting a driving current on the basis of said driving signal;

said driving signal generator including:

a wave form storing means for storing a predetermined wave form;

a comparator for comparing a preset period and phase of said driving signal with a period and a phase of said detection signal which are output from said inputting circuit and calculating a correction value; and a wave form setting means for correcting a period and phase of a stored wave form on the basis of said correction value and generating a predetermined wave form.

2. A motor control apparatus according to claim 1, wherein said inputting circuit includes at least one Hall element for detecting the rotating state of said motor.

3. A motor control apparatus according to claim 2, wherein the number of Hall elements is the same as the number of phases of said motor.

4. A motor control apparatus according to claim 1, wherein said inputting circuit includes at least one detecting circuit for detecting the current which flows in a coil of said motor so as to detect the rotating state of said motor.

5. A motor control apparatus according to claim 4, wherein the number of detecting circuits is the same as the number of phases of said motor.

6. A motor control apparatus for controlling the rotation of a motor by controlling the driving current which is applied to said motor, said apparatus comprising:

an inputting circuit for detecting the rotating state of said motor and outputting a detection signal;

a driving signal generator for generating a driving signal having a predetermined wave form on the basis of said detection signal; and an output amplifier for outputting a driving current on the basis of said driving signal;

said driving signal generator including:

a sine wave form storing means for storing the wave form of a sine wave;

a comparator for comparing a preset period and a phase of said driving signal with a period and a phase of said detection signal which are output from said inputting circuit and calculating a correction value; and a wave form setting means for correcting a period and a phase of the stored sine wave form on the basis of said correction value and generating a predetermined sine wave form.

7. A motor control apparatus according to claim 6, wherein said inputting circuit includes at least one Hall element for detecting the rotating state of said motor.

8. A motor control apparatus according to claim 7, wherein the number of Hall elements is the same as the number of phases of said motor.

9. A motor control apparatus according to claim 6, wherein said inputting circuit includes at least one detecting circuit for detecting the current which flows in a coil of said motor so as to detect the rotating state of said motor.

10. A motor control apparatus according to claim 9, wherein the number of detecting circuits is the same as the number of phases of said motor.

11. A motor control apparatus according to any of the preceding claims claims 1 through 10, wherein said driving signal detector includes an A/D converter for converting said detection signal in an analog form into a digital signal, and a D/A converter for converting said driving signal having a predetermined wave form in the form of a digital signal into an analog driving signal having said predetermined wave form, and said wave form stored in said wave form storing means is stored in the form of a digital value and said comparator and said wave form setting means calculate said corrected value and said wave form by digital processing.

* * * * *